(12) United States Patent
Uhl et al.

(10) Patent No.: US 7,660,194 B2
(45) Date of Patent: Feb. 9, 2010

(54) MICROSEISMIC FRACTURE MAPPING USING SEISMIC SOURCE TIMING MEASUREMENTS FOR VELOCITY CALIBRATION

(75) Inventors: James E. Uhl, Albuquerque, NM (US); Chris Wright, Mill Valley, CA (US); Eric Davis, El Cerrito, CA (US); James Ward, San Francisco, CA (US); Norman Warpinski, Albuquerque, NM (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 11/111,627

(22) Filed: Apr. 21, 2005

(65) Prior Publication Data

US 2006/0023567 A1 Feb. 2, 2006

Related U.S. Application Data

(60) Provisional application No. 60/564,055, filed on Apr. 21, 2004.

(51) Int. Cl.
*G01V 1/40* (2006.01)
(52) U.S. Cl. ............... 367/25; 367/55; 367/57; 181/106
(58) Field of Classification Search ............... 367/13, 367/25, 35, 38, 57, 55; 166/250.1; 181/106, 181/107
See application file for complete search history.

(56) References Cited

U.S. PATENT DOCUMENTS 2,276,335 A 3/1942 Peterson
2,281,751 A 5/1942 Cloud (Continued)

FOREIGN PATENT DOCUMENTS

WO WO 2005/089404 9/2005

(Continued)

OTHER PUBLICATIONS

Walker, Ray N. "Cotton Valley Hydraulic Fracture Imaging Project." SPE 38577, 1997, Society of Petroleum Engineers, Inc.*

(Continued)

*Primary Examiner*—Scott A Hughes
(74) *Attorney, Agent, or Firm*—Schwegman, Lundberg & Woessner, P.A.

(57) ABSTRACT

A system and method for microseismic fracture mapping using seismic source timing measurements for velocity calibration is disclosed. The system may include a seismic source coupled to a wireline and a seismic source trigger, a sensor capable of detecting a first signal from the seismic source trigger, a transmitter coupled to the sensor, capable of transmitting a time value associated with the first signal, a receiver capable of detecting an event generated by the seismic source; and an analyzer capable of calculating a microseismic velocity of the event. In one embodiment, a first signal is transmitted through a wireline to trigger a seismic source. The first signal is detected, and a first time value associated with the first signal is transmitted. An event associated with the seismic source is detected and a second signal associated with the event is transmitted to an analyzer. A microseismic velocity is calibrated based on the time difference between the first time value and a second time value associated with the second signal.

11 Claims, 6 Drawing Sheets

U.S. PATENT DOCUMENTS

| | | | |
|---|---|---|---|
| 2,788,510 A | 4/1957 | Howes | |
| 3,193,004 A | 7/1965 | Albright et al. | |
| 3,739,871 A | 6/1973 | Bailey | |
| 3,876,971 A | 4/1975 | Weunschel | |
| 3,904,840 A | 9/1975 | Kostelnicek | |
| 3,930,145 A | 12/1975 | Fort et al. | |
| 3,949,353 A | 4/1976 | Waters et al. | |
| 3,972,019 A | 7/1976 | Bassett et al. | |
| 3,992,672 A | 11/1976 | Fasching | |
| 4,009,609 A | 3/1977 | Sayer et al. | |
| 4,057,780 A | 11/1977 | Shuck | |
| 4,066,992 A | 1/1978 | Buller et al. | |
| 4,085,798 A | 4/1978 | Schweitzer et al. | |
| 4,106,585 A * | 8/1978 | Huizer | 181/107 |
| 4,181,184 A | 1/1980 | Scherbatskoy | |
| 4,214,226 A | 7/1980 | Narasimhan et al. | |
| 4,271,696 A | 6/1981 | Wood | |
| 4,280,200 A | 7/1981 | Silverman | |
| 4,296,827 A * | 10/1981 | Thigpen et al. | 181/107 |
| 4,314,347 A | 2/1982 | Stokely | |
| 4,353,244 A | 10/1982 | Wood | |
| 4,383,591 A | 5/1983 | Ogura | |
| 4,396,088 A | 8/1983 | Bayhi | |
| 4,399,359 A | 8/1983 | Fertl et al. | |
| 4,445,435 A * | 5/1984 | Oswald | 102/215 |
| 4,516,206 A | 5/1985 | McEvilly | |
| 4,527,636 A * | 7/1985 | Bordon | 175/4.55 |
| 4,534,424 A | 8/1985 | Ramsey | |
| 4,566,083 A | 1/1986 | Thigpen | |
| 4,611,312 A | 9/1986 | Ikeda | |
| 4,635,238 A | 1/1987 | Gallagher et al. | |
| 4,648,039 A | 3/1987 | Devaney et al. | |
| 4,673,890 A | 6/1987 | Copland et al. | |
| 4,686,657 A | 8/1987 | Dellinger et al. | |
| 4,690,214 A | 9/1987 | Wittrisch | |
| 4,701,891 A | 10/1987 | Castagna et al. | |
| 4,747,454 A | 5/1988 | Perryman | |
| 4,759,636 A | 7/1988 | Ahern et al. | |
| 4,770,034 A | 9/1988 | Titchener et al. | |
| 4,815,557 A | 3/1989 | Duwe | |
| 4,828,051 A | 5/1989 | Titchener et al. | |
| 4,870,580 A | 9/1989 | Lang et al. | |
| 4,885,711 A | 12/1989 | Neff | |
| 4,891,640 A | 1/1990 | Ip | |
| 4,895,218 A * | 1/1990 | Chen et al. | 181/116 |
| 4,942,929 A | 7/1990 | Malachosky et al. | |
| 4,951,267 A | 8/1990 | Chang et al. | |
| 4,960,183 A * | 10/1990 | Young, II | 367/144 |
| 4,993,001 A | 2/1991 | Winbow et al. | |
| 5,002,431 A | 3/1991 | Heymans et al. | |
| 5,010,527 A | 4/1991 | Mahrer | |
| 5,040,414 A | 8/1991 | Graebner | |
| 5,108,226 A | 4/1992 | Jennings, Jr. | |
| 5,226,749 A | 7/1993 | Perkins | |
| 5,278,359 A * | 1/1994 | Miller et al. | 181/106 |
| 5,363,095 A | 11/1994 | Normann et al. | |
| 5,377,104 A | 12/1994 | Sorrells et al. | |
| 5,417,103 A | 5/1995 | Hunter et al. | |
| 5,441,110 A * | 8/1995 | Scott, III | 166/308.1 |
| 5,461,594 A | 10/1995 | Mougenot et al. | |
| 5,503,225 A | 4/1996 | Withers | |
| 5,537,364 A | 7/1996 | Howlett | |
| 5,574,218 A | 11/1996 | Withers | |
| 3,295,100 A | 12/1996 | Armistead et al. | |
| 5,746,277 A | 5/1998 | Howell, Jr. | |
| 5,747,750 A | 5/1998 | Bailey et al. | |
| 5,771,170 A | 6/1998 | Withers et al. | |
| 5,774,419 A | 6/1998 | Uhl et al. | |
| 5,917,160 A | 6/1999 | Bailey | |
| 5,934,373 A | 8/1999 | Warpinski et al. | |
| 5,944,446 A | 8/1999 | Hocking | |
| 5,963,508 A | 10/1999 | Withers | |
| 5,996,726 A | 12/1999 | Sorrells et al. | |
| 6,049,508 A | 4/2000 | Deflandre | |
| 6,131,694 A | 10/2000 | Robbins et al. | |
| 6,151,554 A | 11/2000 | Rodney | |
| 6,253,870 B1 | 7/2001 | Tokimatsu et al. | |
| 6,370,784 B1 | 4/2002 | Hunter et al. | |
| 2003/0051873 A1 | 3/2003 | Patzek et al. | |
| 2003/0205375 A1 | 11/2003 | Wright et al. | |
| 2004/0206495 A1 | 10/2004 | Lehman et al. | |
| 2005/0017723 A1 | 1/2005 | Entov et al. | |
| 2005/0060099 A1 | 3/2005 | Sorrells et al. | |
| 2005/0115711 A1 * | 6/2005 | Williams et al. | 166/308.1 |

FOREIGN PATENT DOCUMENTS

| | | |
|---|---|---|
| WO | WO 2005/106533 | 11/2005 |

OTHER PUBLICATIONS

Warpinski, et al. "Microseismic Mapping of Hydraulic Fractures Using Multi-Level Wireline Receivers." SPE 30507, SPE Annual Technical Conference and Exhibition, Dallas, Oct. 1995.*

Rutledge, et al. "Microseismic mapping of a Cotton Valley hydraulic fracture using decimated downhole arrays." SEG International Exposition and Sixty EIghts Annual Meeting, Sep. 13-18, 1998.*

Warpinski et al., "Improved Microseismic Fracture Mapping Using Perforation Timing Measurements for Velocity Calibration," SPE 84488,2003.

Warpinski et al., "Analysis and Prediction of Microseismicity Induced by Hydraulic Fracturing", SPE 71469, 2001.

Nihei, Kurt T., "Natural Fracture Characterization Using Passive Seismic Illumination", Jan. 2003.

International Search Report issued by the US/ISA on Dec. 30, 2005, in connection with International Application No. PCT/US2005/013622.

Written Opinion of the International Searching Authority issued by the ISA/US on Dec. 30, 2005, in connection with International Application No. PCT/US2005/013622.

International Search Report issued by the US/ISA on Mar. 9, 2006, in connection with International Application No. PCT/US2005/008815.

Written Opinion of the International Searching Authority issued by the ISA/US on Mar. 9, 2006, in connection with International Application No. PCT/US2005/008815.

Warpinski, N.R.,. Peterson, R.E, Branagan, P.T., Engler, B.P., and Wolhart, S.L., "In Situ Stress and Modull:Comparison of Values Derived from Multiple Techniques", SPE 49190, 1998 SPE Annual Technical Conference and Exhibition, New Orleans, LA, Sep. 28-30, 1998.

Branagan, P.T., Peterson, R.E., and Warpinski, N.R., "Hydraulic Fracture Growth, Geometry and Far-Field Character Using Advanced Fracture Diagnostic Technologies in the C-Sand Interval: GRI/DOE Multi-Site Project," GRI-98/0250, Gas Research Institute Report, Aug. 1998.

Warpinski, N.R., Branagan, P.T., Peterson, R.E., Wolhart, S.L., "An Interpretation of M-Site Hydraulic Fracture Diagnostic Results," SPE 39950, 1998 Rocky Mountain Regional/Low Permeability Reservoirs Symposium and Exhibition, Denver, CO, Apr. 5-8.

Warpinski, N.R., Branagan, P.T., Peterson, R.E., Wolhart, S.L. and Uhl, J.E., "Mapping Hydraulic Fracture Growth and Geometry Using Microseismic Events Detected by a Wireline Retrievable Accelerometer Array," SPE40014, 1998 Gas Technology Symposium, Calgary, Alberta, Canada, Mar. 15-18.

Branagan, P.T., Peterson, R.E., Warpinski, N.R. and Wright, T.B., "Results of Multi-Site Project Experimentation in the B-Sand Interval; Fracture Diagnostics and Hydraulic Fracture Intersection," GRI-96/0225, Gas Research Institute Report, Dec. 1997.

Warpinski, N.R., Branagan, P.T., Peterson, R.E., Fix, J.E., Uhl, J.E., Engler, B.P. and Wilmer, R., "Microseismic and Deformation Imaging of Hydraulic Fracture Growth and Geometry in the C Sand Interval," GPd/DOE M-Site Project, SPE 38573, 1997, SPE Annual Technical Conference and Exhibition, San Antonio, TX, Oct. 5-8.

Branagan, P.T., Peterson, R.E., Warpinski, N.R., Wolhart, S.L. and Hill, R.E, "Propagation of a Hydraulic Fracture Into a Remote Observation Wellbore: Results of the C-Sand Experimentation at the GRI/DOE MSite Project," SPE38574, 1997 SPE Annual Technical Conference and Exhibition, San Antonio, TX, Oct. 5-8.

Warpinski, N.R., Branagan, P.T., Engler, B.P., Wilmer, R., and Wolhart, S.L., "Evaluation of a Downhole Tiltmeter Array for Monitoring Hydraulic Fractures," 36th U.S. Rock Mechanics Symposium, Columbia University, New York, NY, Jun. 29-Jul. 2, 1997.

Warpinski, N.R., Uhl, J.E., and Engler, B.P., "Review of Hydraulic Fracture Mapping Using Advanced Accelerometer-Based Receiver Systems," U.S. DOE Natural Gas Conference, Houston, TX, Mar. 24-27, 1997.

Branagan, P.T., Peterson, R., Warpinski, N.R. and Wright, T.B., "The Characterization of Remotely Intersected Set of Hydraulic Fractures: Results of Intersection Well No. 1: GRI/DOE Multi-Site Project," SPE 36452, SPE Annual Tech. Conf. & Exhibition, Denver, CO, Oct. 6-9, 1996.

Branagan, P.T., Warpinski, N.R., Engler, B.P., Witmer, R., "Measuring the Hydraulic Fracture-Induced Doformation of Reservoir and Adjacent Rocks Employing a Deeply Buried Inclinometer Array: GRI/DOE Multi-Site Project," SPE 36451, SPE Annual Tech. Conf. & Exhibition, Denver, CO, Oct. 6-9, 1996.

Peterson, R.E., Wolhart, S.L., Frohne, K.-H., Warpinski, N.R., Branagan, P.T. and Wright, T.B., "Fracture Diagnostics Research at the GRI/DOE Multi-Site Project: Overview of the Concept and Results," SPE 36449, proceedings, 1996 SPE Annual Tech. Conf. and Exhibition, Denver, CO, Oct. 6-9, 1996.

Warpinski, N.R., Wright, T.B., Uhl, J.E., Engler, B.P., Drozda, P.M. and Peterson, R.E., "Microseismic Monitoring of the B-Sand Hydraulic Fracture Experiment at the DOE/GRI Multi-Site Project," SPE57593, SPE Journal 4(3), Sep. 1999, pp. 242-250.

Warpinski, N.R., Engler, B.P., Young, C.J., Peterson, R., Branagan, P.T. and Fix, J.E., "Microseismic Mapping of Hydraulic Fractures Using Multi-Level Wireline Receivers," SPE 30507, proc., SPE Annual Tech. Conf. and EXh., Dallas, TX, Oct. 22-25, 1995, 579-589.

Young, C and Warpinski, N.R., Microseism Location Analysis, GRI-96/0338, Gas Research Institute Report, Sep. 1996.

Peterson, R., Warpinski, N.R., Wright, T.B., Branagan, P.T, and Fix, J.E. "Results of Multi-Site Experimentation in the A-Sand Interval: Fracture Diagnostics, Fracture Modeling and Crosswell Tomography," GRI Topical Report, GRI-95/0046, Feb. 1995.

Hill, R.E., Peterson, R.E., Warpinski, N.R., Lorenz, J.C., Teufel, L.W. and Aslakson, J.K., "Techniques for Determining Subsurface Stress Direction and Assessing Hydraulic Fracture Azimuth," SPE 29192, Proceedings, SPE Eastern Regional Conference, pp. 305-320, Charleston, WV, Nov. 6-10, 1994.

Warpinski, N.R., "Interpretation of Hydraulic Fracture Mapping Experiments," SPE 27985, Proceedings, The University of Tulsa Centennial Petroleum Engineering Symposium, Tulsa, OK, pp. 291-300, Aug. 29-31, 1994.

Steefe, G.E., Warpinski, N.R. and Engler, B.P., "The Use of Broadband Microseisms for Hydraulic Fracture Mapping," SPE Formation Evaluation, Dev. 1995, pp. 233-239.

Middlebrook, M., Peterson, R.E., Warpinski, N.R., Engler, B.P., Sleefe, G.E., Cleary, M., Wright, T. and Branagan, P.T., "Multi-Site Project Seismic Verification Experiment and Assessment of Site Suitability," GRI-93/0050, Gas Research Institute Report, Feb. 1993.

Warpinski, N. R., Lorenz, J. C., Brangan, P. T., Myal, F. R., and Gall, B. L., "Examination of a Cored Hydraulic Fracture in a Deep Gas Well,"SPE Production & Facilities, vol. 8, pp. 150-158, Aug. 1993.

Warpinski, N. R. "Hydraulic Fracturing in Tight Fissured Media," JPT, vol. 43, pp. 146-152 and 208-209, Feb. 1991.

Warpinski, N. R., Branagan, P. T., Sattler, A. R., Cipolla, C. L., Lorenz, J. C., and Thorne, B. J., "A Case Study of a Simulation Experiment in a Fluvial, Tight, Sandstone Gas Reservoir," SPE Production, vol. 4, pp. 403-410, Nov. 1990.

Warpinski, N. R., "Dual Leakoff Behavior in Hydraulic Fracturing of Tight, Lenticular Gas Sands," SPE Production Engineering, vol. 4, pp. 243-252, Aug. 1990.

Branagan, P. T., Sattler, A. R., Lorenz, J. C., Northrop, D. A., Mann, R. L., and Frohne, K. H., "Fracturing and Testing Case Study of Paludal, Tight, Lenticular Gas Sands," SPE Formation Evaluation, vol. 2, pp. 535-545, Dec. 1987.

Warpinski, N. R., Branagan, P. T., "Altered-Stress Fracturing," Journal of Petroleum Technology, Sep. 1989; pp. 990-998.

Engler, B. P., Warpinski, N. R., "Hydraulic Fracture Imaging Using Inclinometers at M-Site: Finite-Element Analyses of the B-Sandstone Experiments"; GRI-97-0361, Gas Research Institute Annual Report, Dec. 1997.

Burghardt et al.; "Influence of the Bandpass Filtering and Model Order on the Autoregressive Seismic Detection in the Real-Time Domain," Computers & Geosciences vol. 19, No. 2, pp. 111-115, 1993.

McEvilly et al.; "ASP: An Automated Seismic Processor for Microearthquake Networks," Bulletin of the Seismological Society of America, vol. 72, No. 1, pp. 303-325, Feb. 1982.

Murdock et al.; "A New Event Detector Designed for the Seismic Research Observatories," United States Department of the Interior Geological Survey, Oct. 1983.

Warpinski, N. R., Abou-Sayed, I. S., Moschovidis, Z., Parker, C., "Hydraulic Fracture Model Comparison Study: Complete Results," Gas Research Institute Topical Report GRI-93/0109, Feb. 1993.

C. Cipolla and C. Wright, Diagnostic Techniques to Understand Hydraulic Fracturing: What? Why? and How? SPE 59735, 2000 SPE/CERI Gas Technology Symposium, Apr. 3-5, 2000, Calgary, Alberta, Canada.

E. Davis, C. Wright, S. Demetrius, J. Choi, and G. Craley, Precise Tiltmeter Subsidence Monitoring Enhances Reservoir Management, SPE 62577, SPE Western Regional Conference, Jun. 19-23, 2000, Long Beach, CA.

P. Davis, Surface Deformation Associated with a Dipping Hydro fracture, Journal of Geophysical Research, vol. 88, No. B7, 1983, pp. 5826-5834.

L. Griffin, C. Wright, X. Moschovidis, Tiltmeter Mapping to Monitor Drill Cuttings Disposal, presented at the $37^{th}$ US Rock Mechanics Symposium, Vail, CO, Jun. 6-9, 1999.

L. Griffin, C. Wright, E. Davis, S. Wolhart, and E. Davis, Surface and Downhole Tiltmeter Mapping: An Effective Tool for Monitoring Downhole Drill Cuttings Disposal, SPE 63032, 2000 SPE Annual Technical Conference, Oct. 1-4, 2000, Dallas, TX.

K. Lang, Improvements in Fracture Stimulation Technology, PTTC Network News, vol. 7, No. 1, $1^{st}$ Quarter 2001.

Mayerhofer, M., et al; Surface Tiltmeter Mapping; XP -002176044, from SPE 59715, 2000 SPE Permian Basin Oil & Gas Recovery Conference, Midland, TX, Mar. 21-23, 2000.

P. Perri, M. Emanuele, W. Fong, M. Morea, Lost Hills $CO_2$ Pilot Evaluation, Design, Injectivity Test Results, and Implementation, SPE 62526, SPE Western Regional Conference, Jun. 19-23, 2000, Long Beach, CA.

Warpinski, N. et al.; Microseismic Monitoring of the B-Sand Hydraulic-Fracture Experiments at the DOE/GRI Multisite Project, SPE Journal 4 (3), Sep. 1999, pp. 242-250.

Wright, Chris; Tiltmeter Fracture Mapping: From the Surface and Now Downhole, Hart's Petroleum International, Jan. 1998.

C. Wright, E. Davis, W. Minner, J. Ward, L. Weijers, E. Schell, and S. Hunter, Surface Tiltmeter Fracture Mapping reaches New Depths—10,000 Feet, and Beyond?, SPE 39919, SPE Rocky Mountain Regional Conference, Apr. 5-8, 1998, Denver, CO.

C. Wright, E. Davis, G. Golich, J. Ward, S. Demetrius, W. Minner, and L. Weijers, Downhole Tiltmeter Fracture: Finally Measuring Hydraulic Fracture Dimensions, SPE 46194, SPE Western Regional Conference, May 10-13, 1998, Bakersfield, CA.

C. Wright, E. Davis, L. Weijers, Downhole Tiltmeter Fracture Mapping: A New Tool for Directly Measuring Hydraulic Fracture Dimensions, SPE 49193, 1998 SPE Annual Technical Conference and Exhibition, Sep. 1998, New Orleans, LA.

Communication from the U.S. Patent and Trademark Office dated Sep. 9, 2004 regarding U.S. Appl. No. 10/258,669.

Communication from the U.S. Patent and Trademark Office dated Mar. 11, 2005 regarding U.S. Appl. No. 10/258,669.

Communication from the International Preliminary Examining Authority dated Apr. 12, 2002 regarding International Application No. PCT/US01/13594.

Communication from the International Searching Authority dated Sep. 13, 2001 regarding International Application No. PCT/US01/13594.

Communication from the International Searching Authority dated Apr. 6, 2005 regarding International Application No. PCT/US04/29962.

Communication from the U.S. Patent and Trademark Office dated Nov. 23, 2004 regarding U.S. Appl. No. 10/674,937.

Communication from the U.S. Patent and Trademark Office dated Apr. 7, 2005 regarding U.S. Appl. No. 10/674,937.

Communication from the International Preliminary Examining Authority dated Oct. 26, 2005 regarding International Application No. PCT/US04/29962.

"European Application Serial No. 05738391.1, Supplementary European Search Report mailed Mar. 17, 2009", 3 pgs.

* cited by examiner

MICROSEISMIC FRACTURE MAPPING USING SEISMIC SOURCE TIMING MEASUREMENTS FOR VELOCITY CALIBRATION

CROSS REFERENCE TO RELATED APPLICATIONS

This patent application is a non-provisional of U.S. Provisional Patent Application No. 60/564,055, filed on Apr. 21, 2004, and entitled "Microseismic Fracture Mapping Using Seismic Source Timing Measurements For Velocity Calibration," which is incorporated by reference herein in its entirety.

FIELD OF THE INVENTION

This invention relates generally to microseismic events and, more particularly, to a method for the in situ determination of the distribution and orientation of fractures in subterranean formations.

BACKGROUND OF THE INVENTION

Seismic data is used in many scientific fields to monitor underground events in subterranean rock formations. In order to investigate these underground events, micro-earthquakes, also known as microseisms, are detected and monitored. Like earthquakes, microseisms emit elastic waves—compressional ("p-waves") and shear ("s-waves"), but they occur at much higher frequencies than those of earthquakes and generally fall within the acoustic frequency range of 200 Hz to more than 2000 Hz. Standard microseismic analysis techniques locate the sources of the microseismic activity by fluid injection or hydraulic fracturing. In many gas fields, permeability is too low to effectively produce gas in economic quantities. Hydraulic fracturing addresses this problem by intentionally creating fractures in the gas fields that provide conduits to enhance gas flow. Fluid is pumped into wells at sufficient pressure to fracture the rock. The fluid also transports a propping agent (also known as "proppant") into the fracture. The proppant, usually sand or ceramic pellets, settles in the fractures and helps keep the fracture open when the fracturing operation ceases. Production of gas is accelerated as a result of improved capability for flow within the reservoir. Similarly, water flooding of largely expended oil fields seeks to push oil to other wells where it is produced. Fractures are often created in this process that direct the oil in a potentially unknown direction. In this process, water, or possibly steam, is used to increase pressure and/or temperature to displace the oil to a more favorable production location.

Microseismic detection is often utilized in conjunction with hydraulic fracturing or water flooding techniques to map created fractures. A hydraulic fracture induces an increase in the formation stress proportional to the net fracturing pressure as well as an increase in pore pressure due to fracturing fluid leak off. Large tensile stresses are formed ahead of the crack tip, which creates large amounts of shear stress. Both mechanisms, pore pressure increase and formation stress increase, affect the stability of planes of weakness (such as natural fractures and bedding planes) surrounding the hydraulic fracture and cause them to undergo shear slippage. It is these shear slippages that are analogous to small earthquakes along faults.

Microseisms are detected with multiple receivers (transducers) deployed on a wireline array in one or more offset well bores. With the receivers deployed in several wells, the microseism locations can be triangulated as is done in earthquake detection. Triangulation is accomplished by determining the arrival times of the various p- and s-waves, and using formation velocities to find the best-fit location of the microseisms. However, multiple offset wells are not usually available. With only a single nearby offset observation well, a multi-level vertical array of receivers is used to locate the microseisms. Data is then transferred to the surface for subsequent processing to yield a map of the hydraulic fracture geometry and azimuth. Once the microseisms are located, the actual fracture is interpreted within the envelope of microseisms mapped. However, the precise length, direction, and height of the created fractures will not be obtainable unless the microseismic events are accurately detected from beginning to end.

DETAILED DESCRIPTION OF THE INVENTION

The invention relates to microseismic events and, more particularly, to a method for the in situ determination of the distribution and orientation of fractures in subterranean formations. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Further, the drawings are used to facilitate the present disclosure, and are not necessarily drawn to scale.

Figure 1:
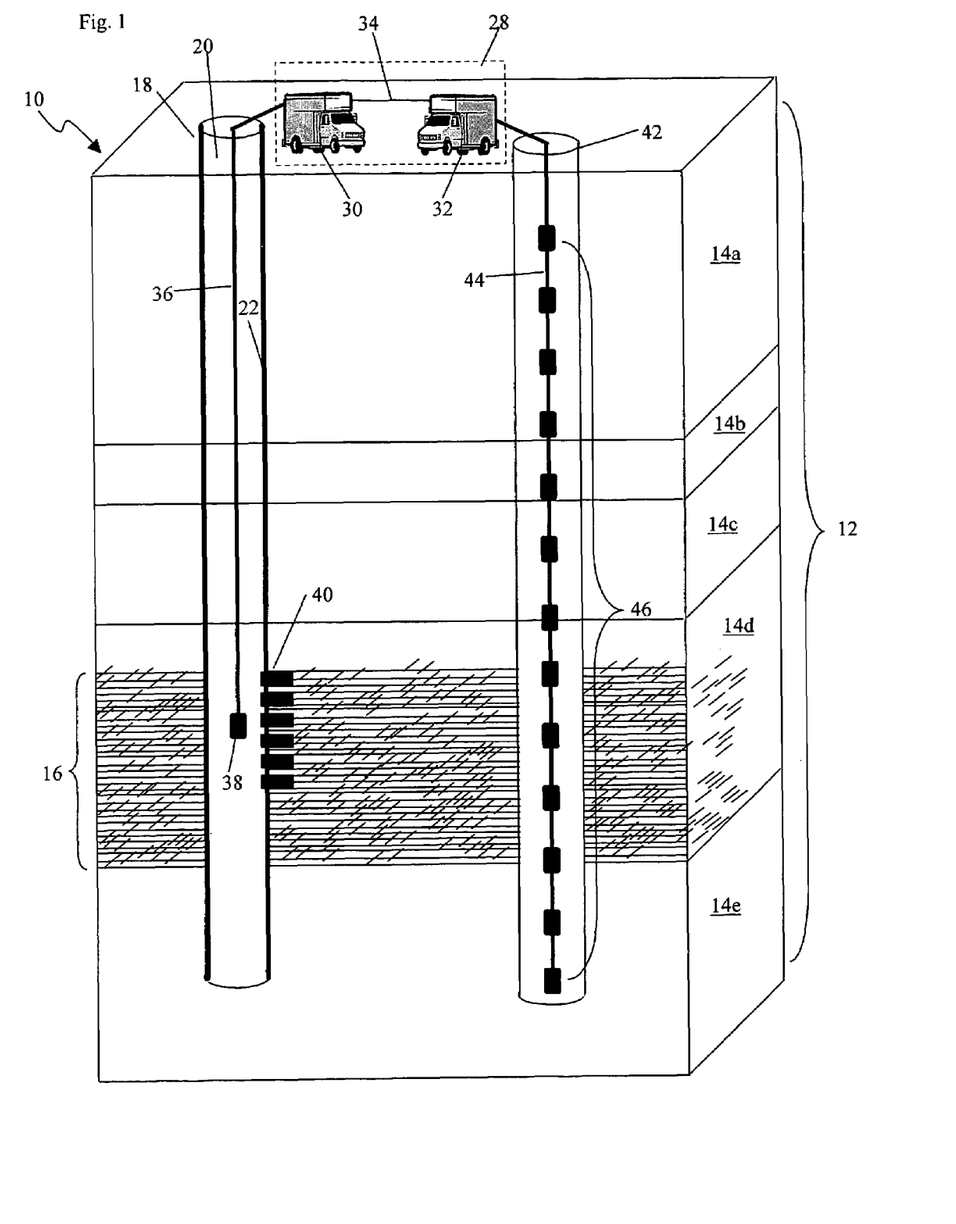
FIG. 1 is a schematic of an embodiment of the present invention.

Referring now to FIG. 1, a partial cutaway view 10 is shown with a treatment well 18 that extends downward into strata 12, through one or more geological layers 14a-14e. While wells are conventionally vertical, the invention is not limited to use with vertical wells. Thus, the terms "vertical" and "horizontal" are used in a general sense in their reference to wells of various orientations.

The preparation of treatment well 18 for hydraulic fracturing typically comprises drilling a bore 20. Bore 20 may be drilled to any desired depth. A casing 22 may be cemented into well 18 to seal the bore 20 from the geological layers 14.

A perforation timing assembly 28 can be used to conduct microseismic fracture mapping using seismic source timing measurements for velocity calibration. In one embodiment, perforation timing assembly 28 comprises a transmitter system 30 and a data analysis system 32 coupled via a transmitting medium 34, such as fiber optic cable, wire cable, radio or other conventional transmission system.

In one embodiment, transmitter system 30 is attached to a wireline 36 that is extended into well 18. A seismic source 38 may be coupled to wireline 36. As one skilled in the art will appreciate, seismic source 38 may be any type of apparatus capable of generating a seismic event, for example, a perforating gun, string shot, primacord wrapped around a perforation gun or other tool, or any other triggered seismic source. In one embodiment, seismic source is triggered electrically through wireline 36. For testing purposes, a perforating gun simulator could be coupled to wireline 36 in addition to, or in lieu of, perforating gun 38.

In one embodiment, perforating gun 38 creates perforations 40 through casing 22. While embodiments of the present invention may be practiced in a cased well, it is contemplated that embodiments of the present invention may also be practiced in an uncased well.

Perforating gun 38 may be raised and lowered within well 18 by adjusting the length of wireline 36. The location of perforations 40 may be at any desired depth within well 20, but are typically at the level of a rock formation 16, which may be within one or more of the geological layers 14a-14e. Rock formation 16 may consist of oil and/or gas, as well as other fluids and materials that have fluid-like properties.

In one embodiment, data analysis system 32 may extend a wireline 44 into a well 42. One or more receiver units 46 may be coupled to wireline 44. In one embodiment, an array of receiver units 46 are coupled to wireline 44. Receiver units 46 preferably contain tri-axial seismic receivers (transducers) such as geophones or accelerometers, i.e., three orthogonal geophones or accelerometers, although for some applications it will not be necessary that receivers be used for all three directions. The type of receiver unit chosen will depend upon the characteristics of the event to be detected. In one embodiment, the characteristic may be the frequency of the event.

The desired amount of independent information, as well as the degree of accuracy of the information to be obtained from a seismic event will affect the minimum number of receiver units 46 used. In a number of applications, including the hydraulic fracturing technique, important information includes the elevation of the source of the microseismic waves with regard to an individual receiver unit 46, and the distance away from a given receiver unit 46. Time of origination of seismic event is a frequently used metric, as well. As shown in FIG. 1, at least one receiver unit 60 is vertically disposed within well 42 on a wireline 44. According to certain embodiments of the present invention, multiple receiver units 46 may be spaced apart on wireline 44. The distance between individual receiver units 46 in a multi-unit array is selected to be sufficient to allow a measurable difference in the time of arrival of acoustic waves from a seismic event that originates from well 18.

Well 42 may be laterally spaced from well 18 and may extend downwardly through rock formation 16. While in many instances only a single offset well bore is available near the treatment well, it will be appreciated that multiple wells 42 may exist in proximity to well 18, and that multiple data analysis systems 32 may be used in with multiple wells 42. The distance between well 18 and well 42 is often dependent on the location of existing wells, and the permeability of the local strata. For example, in certain locations, the surrounding strata may require that well 18 and well 42 to be located relatively close together. In other locations, the surrounding strata may enable well 18 and well 42 to be located relatively far apart. It will also be appreciated that well 42 may contain a casing or be uncased.

Figure 2:
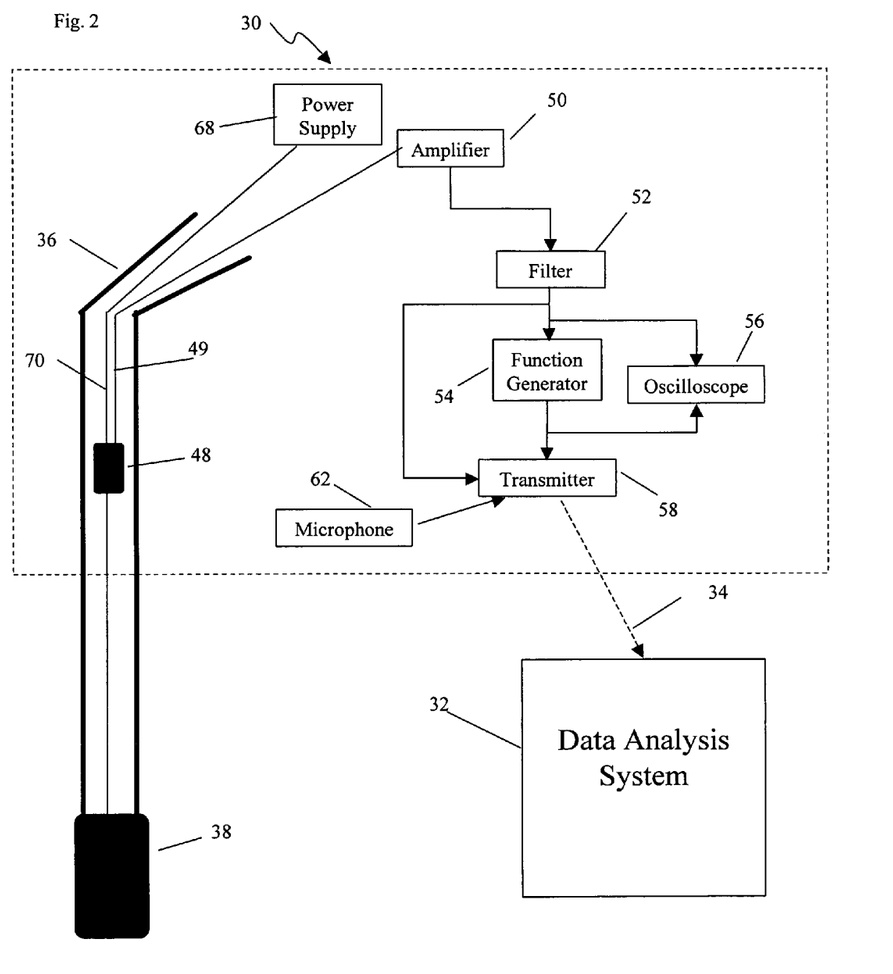
FIG. 2 is a schematic of a transmitter system in one embodiment of the present invention.

Referring now to FIG. 2, an exemplary transmitter assembly 30 is illustrated. In this embodiment, transmitter assembly 30 includes a sensor or current probe 48, an amplifier 50, a filter 52, a function generator or trigger detection circuits 54, an oscilloscope 56, and a transmitter 58. Certain embodiments of transmitter assembly 30 may also include a microphone 62. It is contemplated by the present invention that some or all of components of transmitter system 30 could be combined into one or more computing devices.

In one embodiment, perforating gun 38 is connected via wireline 36 to a seismic source trigger 68. In one embodiment, seismic source 68 trigger is a power supply that provides the electrical energy to enable perforating gun 28 to create the perforations in the well. It will be appreciated that some or all of the sections of wireline 36 may be any type of electrical connection means suitable for connecting perforating gun 38 to power supply 68 including, but not limited to, electrical wire, cable or fiber optic cable. In one embodiment, a firing line 70 may be used.

Sensor 48 may be any sensor or sensor probe capable of measuring the electromagnetic field near an electrical current-carrying wire or cable or measuring the current itself, such as the 5200 sensor probe sold by Fluke Corporation of Everett, Wash. In one embodiment, sensor 48 is placed around either the center conductor or outer conductor of firing line 70 if the center conductor can be isolated from the outer conductor. In another embodiment, a bypass wire may be clamped to the exposed armor of a section of wireline 36 in two locations and sensor 48 may be placed around either the bypass wire or the section of wireline 36 that has been bypassed. If the resistance of the bypass wire is not significantly higher than the resistance of the armor of wireline 36, enough current may shunted into the bypass wire to allow sensor 48 to detect the current sent from power supply 68 to perforating gun 38.

Sensor 48 may also be connected to amplifier 50. Amplifier 50 may be a current probe amplifier, such as the AM503S amplifier (DC to 50 MHz, 20 A Continuous/50 A Peak, Max. Conductor Diameter 0.15 in) sold by Tektronix of Beaverton, Oreg. Amplifier 50 transmits the signal to filter 52. Filter 52 is any filter system suitable to reduce the amplitude of any extraneous signals. In one embodiment, filter 52 has minimum transient distortion to minimize any delay to the filtering of the signal.

Filter 52 provides at least two output signals. The first output signal from filter 52 is sent to transmitter 58 for transmission via transmission medium 34. The second output signal from filter 52 is sent to function generator 54. Function generator 54 is a conventional function generator used to detect the filtered pulse and generate a high-amplitude timing pulse (fidu). In one embodiment, a preferred function generator 54 has a pulse output of 5V at 1 mS. Transmitter 58 is capable of transmitting the high-amplitude timing pulse via transmission medium 34.

In one embodiment, an operator may use oscilloscope 56 to monitor the filtered signal transmitting from filter 52 and the output from function generator 54. A test system can also be used to provide a test signal in order to correctly adjust the settings for amplifier 50, filter 52, and function generator 54.

Figure 3:
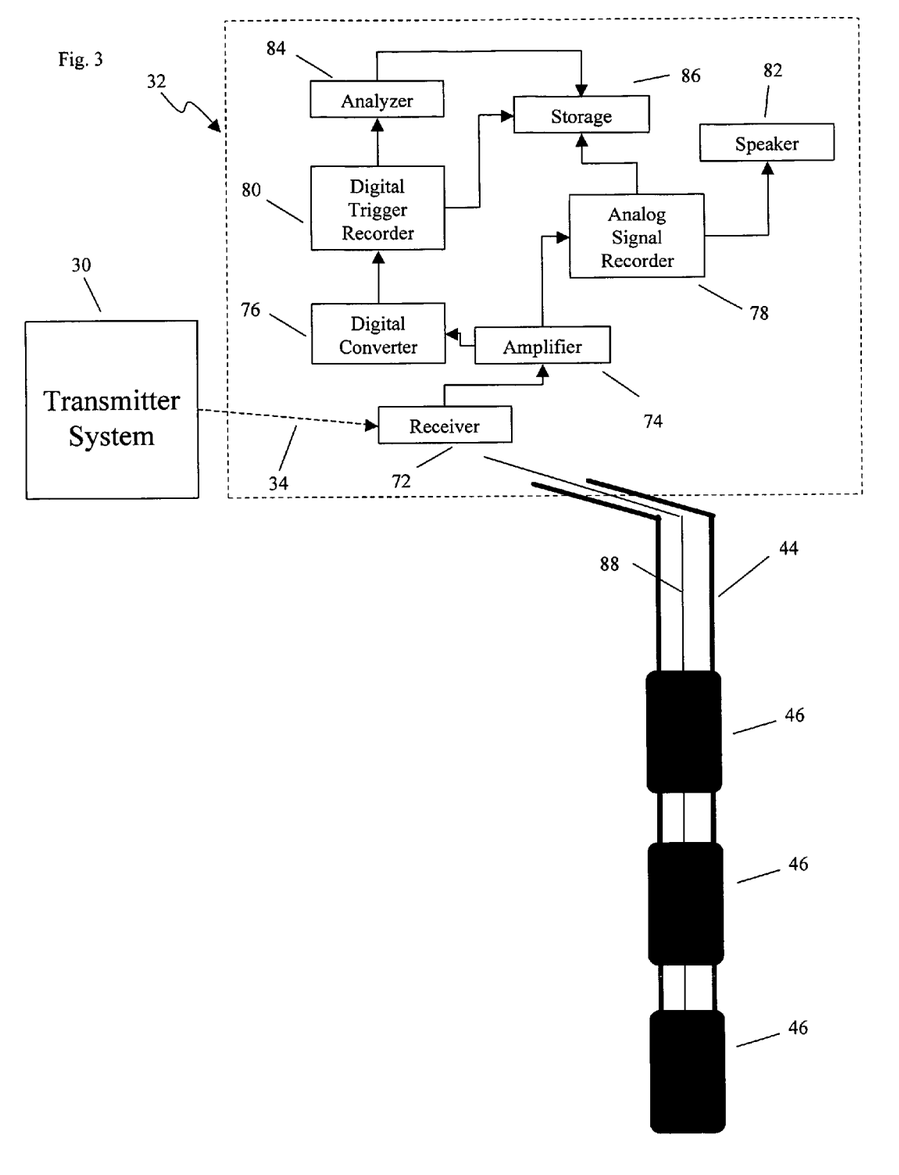
FIG. 3 is a schematic of a data analysis system in one embodiment of the present invention.

Referring now to FIG. 3, an exemplary data analysis system 32 is illustrated. In this embodiment, data analysis system 32 includes receiver 72, amplifier 74, digital converter 76, analog signal recorder 78, digital trigger recorder 80, speaker 82, analyzer 84, and storage memory 86. It is contemplated by the present invention that some or all of components of data analysis system 32 could be combined into one or more computing devices.

When a seismic event occurs, receiver units 60 detect the seismic waves. Receiver units 60 transmit the detected waves along signal line 88 to receiver 72. In one embodiment, the detected waves are amplified using amplifier 74.

Digital converter 76 is capable of converting the detected waves into digital signals. Analyzer 84 analyzes the digital signals to discern properties about the seismic event. A personal computer may be used to as analyzer 84.

Additionally, the detected waves may be recorded in original analog form by analog signal recorder 78. The analog signals may be stored in storage memory 86, as well as delivered aurally by speaker 82.

Storage memory 86 may be such media as a tape backup, hard drive, CD-ROM, DVD, or the like. A standard file format, such as the SEG2 format, may be used. In one embodiment, a single microseismic event may occupy about 286 kilobytes of file space. In another embodiment, a recording of signals at sampling frequencies of 4,000 Hz in a continuous mode for four seconds results in about 2 megabytes of file space.

Figure 4:
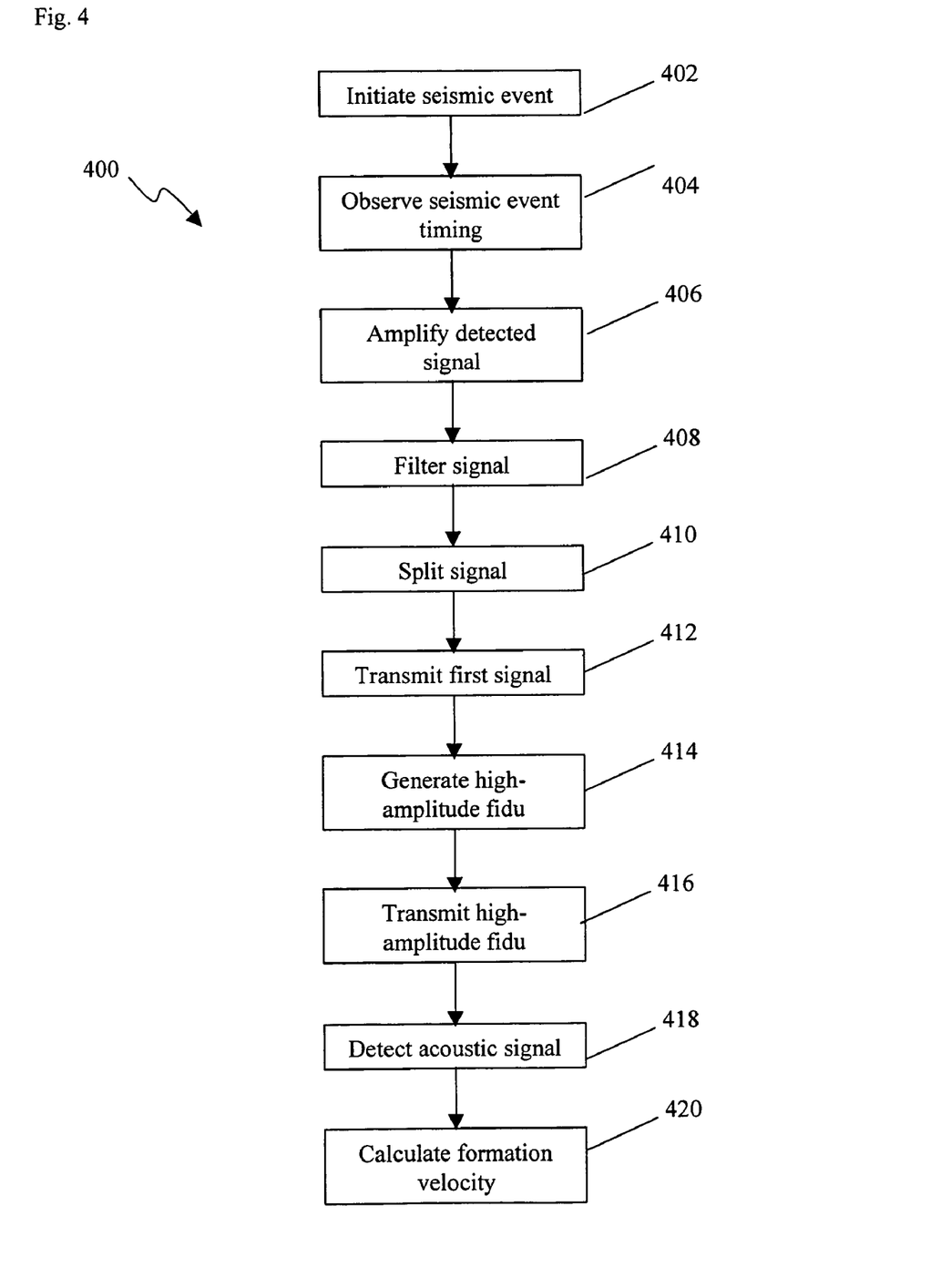
FIG. 4 is an illustration of an operational flow of one embodiment of the present invention.

Referring now to FIG. 4, an exemplary operational flow 400 of an embodiment of the present invention is illustrated. At step 402, a seismic event is initiated. In one embodiment, a power supply sends an electrical signal to a perforating gun down a well. In other embodiments, other explosive sources of seismic energy can also be used. In particular, string shots (primacord wrapped around a piece of metal) are often used for repeat shots, for cases where the perforations had already been performed, and for cases where the treatment well is not cased (usually horizontal wells).

At step 404, the time of the seismic event is observed. In one embodiment, the sensor capable of detecting an electrical signal is coupled to a wire between the power supply and the perforating gun. The sensor sends out a signal when it detects a current change in the wire between the power supply and the perforating gun.

At step 406, the seismic-event-detected signal may amplified. At step 408, the signal is filtered to remove noise or other signals caused by other devices or events, such as the signal caused by the acoustic safety alarm that is often activated prior to the triggering of a seismic event.

At step 410, the seismic-event-detected signal may then be split. The first split signal may be transmitted to a data analysis system, step 412. At step 414, a function generator detects the filtered pulse from the second split signal and generates a high-amplitude timing pulse. At step 416, the high-amplitude timing pulse is transmitted to a data analysis system, thereby establishing the exact time at the seismic event occurred.

At step 418, the acoustic signal generated by the firing of perforation gun is detected. The acoustic signal contains both p- and s-waves. At step 420, the time difference between the occurrence of the seismic event and the acoustic signal arrival at receiver units is used to calculate the formation velocity given the interval distance between the well in which the seismic event occurred and the well in which the receiver units were located.

In the perforation-timing procedure of the present invention, cross-well velocity data is obtained by monitoring the firing pulse from the receiver-orientation perforations (or string shots) and recording the timing pulse along with the arrival data. The timing resolution is normally set by the sample rate of the data acquisition system. An example of this condition would be typically 125 to 250 microseconds. From these results, a simple one-dimensional model of velocities can be extracted and used to validate, refine, or correct the detailed dipole sonic data or provide a warning of discrepancies.

Perforation-timing data can be used to calculate the average velocities between the perforation and each receiver to correct events that occur near the perforations. If there is sufficient information to determine the boundaries of a limited number of major layers, and if it is assumed that each of the layers has constant p-wave and s-wave velocities, then the travel time information can be inverted for velocities in those layers. The additional information delimiting layers would optimally be obtained from a dipole sonic log, but could also be determined from various lithology logs.

Any wave passing through a layered formation must obey Snell's law, which for any case is given by $$\sin\theta_j = \frac{V_j}{V_{j+1}}\sin\theta_{j+1} = \frac{V_j}{V_{j+2}}\sin\theta_{j+2} = \cdots = \frac{V_j}{V_{j+1}n}\sin\theta_{j+n}$$

where the $V_j$ are the velocities in the layers and the $\theta_j$ are the incident angles.

Once one of the angles is known, all of the others can be computed from Snell's law. To obtain the angles, it is only necessary to find the takeoff angle (e.g., the angle leaving the perforation) that gives an arrival at the receiver station. This is assured by stipulating that $r=x_j+x_{j+1}+x_{j+2}+\ldots+x_{j+n}$ for however many layers. The resulting expression for the takeoff angle can be written in a form that allows for efficient iterative solution by $$\tan\theta_j = rV_j \bigg/ \Bigg[ d_j V_j + \frac{d_{j+1}V_{j+1}\sqrt{1-\sin^2\theta_j}}{\sqrt{1-\left(\frac{V_{j+1}}{V_j}\right)^2\sin^2\theta_j}} + \frac{d_{j+2}V_{j+2}\sqrt{1-\sin^2\theta_j}}{\sqrt{1-\left(\frac{V_{j+2}}{V_j}\right)^2\sin^2\theta_j}} + \cdots + \frac{d_{j+n}V_{j+n}\sqrt{1-\sin^2\theta_j}}{\sqrt{1-\left(\frac{V_{j+n}}{V_j}\right)^2\sin^2\theta_j}} \Bigg]$$

In this equation, the $d_j$ are the vertical distances the wave travels in the $j^{th}$ layer. It may be the layer thickness or the distance from the layer boundary to the perforation or the receiver. The equation is solved by choosing an initial guess for $\theta_j$ and iterating until it converges on the correct values. All the other angles are then computed from Snell's law. It is necessary, however, to test the angles at each iterative step to assure that angles greater than the critical angle do not develop.

However, this calculation requires knowledge of the velocities, so an initial guess is made (uniform velocity is a reasonable initial guess) and the angles are calculated. Next, the perforation arrival-time data are used in a regression to find an updated estimate of the velocities. The travel time from perforation to receiver is given by $$\Delta t_i = \frac{d_j}{V_j \cos\theta_j} + \frac{d_{j+1}}{V_{j+1}\cos\theta_{j+1}} + \frac{d_{j+2}}{V_{j+2}\cos\theta_{j+2}} + \cdots + \frac{d_{j+n}}{V_{j+n}\cos\theta_{j+n}}, \quad (3)$$

where the $\Delta t_i$ refers to the total travel time from the perforation to the $i^{th}$ receiver (the total time is obtained from the timing measurements).

Velocities can now be determined using a multiple linear regression that results in a system of equations of the form $$\frac{1}{V_1}\sum_i \frac{d_{1i}^2}{\cos^2\theta_{1i}} + \frac{1}{V_2}\sum_i \frac{d_{1i}d_{2i}}{\cos\theta_{1i}\cos\theta_{2i}} + \cdots + \frac{1}{V_n}\sum_i \frac{d_{1i}d_{ni}}{\cos\theta_{1i}\cos\theta_{ni}} =$$
$$\sum_i \frac{d_{1i}\Delta t_i}{\cos\theta_{1i}}$$

$$\frac{1}{V_1}\sum_i \frac{d_{1i}d_{2i}}{\cos\theta_{1i}\cos\theta_{2i}} + \frac{1}{V_2}\sum_i \frac{d_{2i}^2}{\cos^2\theta_{2i}} + \cdots + \frac{1}{V_n}\sum_i \frac{d_{2i}d_{ni}}{\cos\theta_{2i}\cos\theta_{ni}} =$$
$$\sum_i \frac{d_{2i}\Delta t_i}{\cos\theta_{2i}}$$

$$\vdots$$

$$\frac{1}{V_1}\sum_i \frac{d_{1i}d_{ni}}{\cos\theta_{1i}\cos\theta_{ni}} + \frac{1}{V_2}\sum_i \frac{d_{2i}d_{ni}}{\cos\theta_{2i}\cos\theta_{ni}} + \cdots + \frac{1}{V_n}\sum_i \frac{d_{ni}^2}{\cos^2\theta_{ni}} =$$
$$\sum_i \frac{d_{ni}\Delta t_i}{\cos\theta_{ni}}$$

for each of the n layers.

In this case, the subscripts on d refer to the layer number and then the receiver/perforation pair. That is, for each perforation, every receiver has a different travel path through the reservoir and consequently has a different set of d values.

The resulting system of equations can be solved directly for the velocities (all of the summation terms are known, given the previous update or initial guess). Using the new velocities, the angles are recomputed and the velocities solved again. This is done until convergence occurs.

One other situation is the occurrence of head waves, if sufficient conditions exist. Fortunately, if there is a head wave, then the incident angles are known (the critical angle occurs at the head-wave layer) and there is no need to iterate on the takeoff angle. It is only necessary to extrapolate back to the receiver and perforation using Snell's law (making sure that the distance traveled in the head-wave layer is positive) and then checking to see if the travel times are less through the head-wave layer than they are through the normal refracted path. If there are head waves, the system of equations is the same, but another layer is added for the head-wave layer and additional terms are added to account for the additional path. Any number of layers can be checked to determine if head waves are possible.

Generally, the number of layer velocities that can be extracted is about ⅓ to ½ of the number of perforation-receiver pairs, with the additional constraint that each layer is interrogated by at least 2 pairs of data. This analysis is performed for both p and s waves, if sufficient data are available.

If the layers are not uniform, such as in dipping or pinching beds or near faults, then a more complicated approach can be employed if the layer geometry is known from other information, such as nearby wells or surface seismic surveys. In such a case, the forward-model and grid-search algorithms of Vidale and Nelson can be employed in a procedure to optimize the velocities such that they correctly locate the perforation while minimizing residuals (difference between calculated and observed travel times).

One procedure for extracting the one-dimensional velocity model from the perforation timing results is a simplified ray-tracing inversion, although other approaches may also be applied. Since there will only be a few ray paths (even if several perforation shots are monitored), a detailed tomogram of the velocity structure cannot be developed. However, if standard geophysical logs can be used to discriminate a limited number of major layers assumed to have constant velocities within those layers, then an inversion of the data for velocities can be obtained using ray-tracing techniques (including head waves). In more complicated cases, such as where a fault is known to exist and the fault displacement is known, iteration using a general forward model (e.g., Vidale) may also be applied.

Figure 5:
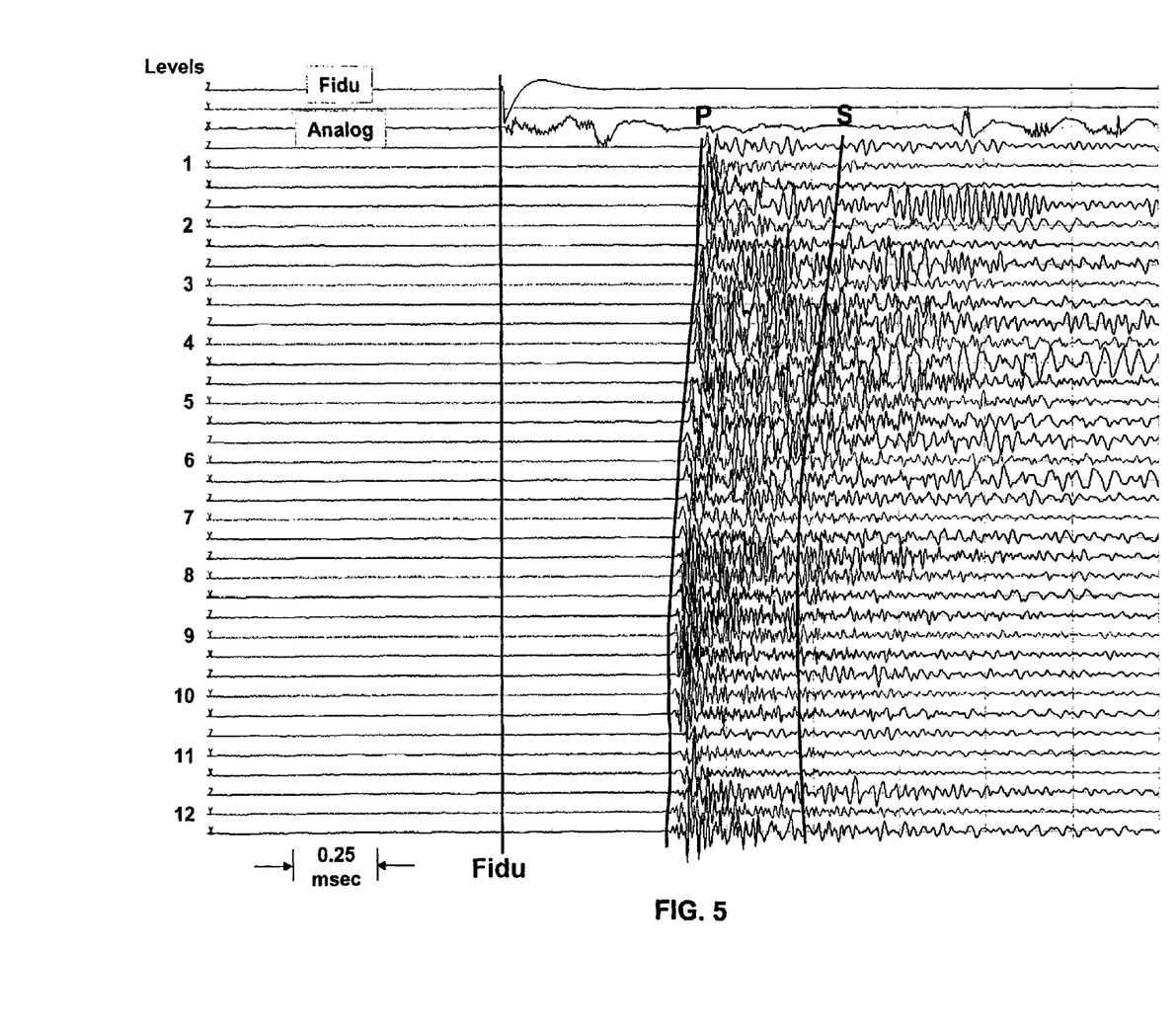
FIG. 5 is a graph of the data generated by one embodiment of the present invention.

FIG. 5 depicts a data set with the perforation fidu and the seismic arrivals of the perforation signals. The top trace shows the perforation fidu. The next trace is not used, but the third trace shows the analog signal from the sensor probe. The remaining traces are the seismic data from the receiver units in groups of three. The arrivals are the compressional wave (p-wave) and the timing difference between the perforation fidu and the arrival can be used to determine the velocity between the perforation location and the receiver unit location. In this data set, twelve receiver units were used.

Other embodiments of the present invention include monitoring of any injection processes, such as drill cuttings injection, steam injection, waterflooding, and other enhanced oil recovery techniques, as well as the monitoring of general reservoir behavior during production (reservoir management).

Figure 6:
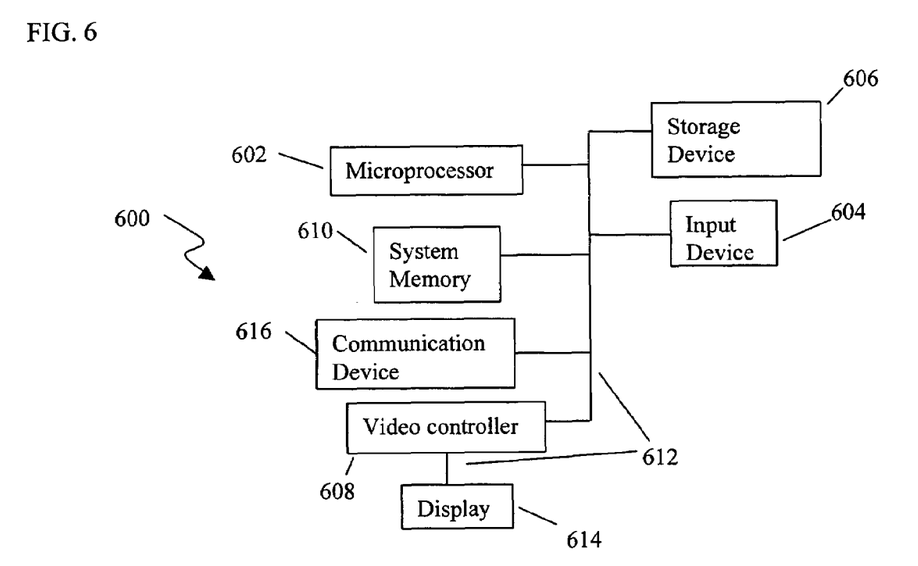
FIG. 6 is a schematic of a computer system for implementing one embodiment of the present invention.

It will also be understood by those having skill in the art that one or more (including all) of the elements/steps of the present invention may be implemented using software executed on a general purpose computer system or networked computer systems, using special purpose hardware-based computer systems, or using combinations of special purpose hardware and software. Referring to FIG. 6, an illustrative node 600 for implementing an embodiment of the method is depicted. Node 600 includes a microprocessor 602, an input device 604, a storage device 606, a video controller 608, a system memory 610, and a display 614, and a communication device 616 all interconnected by one or more buses 612. The storage device 606 could be a floppy drive, hard drive, CD-ROM, optical drive, or any other form of storage device. In addition, the storage device 606 may be capable of receiving a floppy disk, CD-ROM, DVD-ROM, or any other form of computer-readable medium that may contain computer-executable instructions. Further communication device 916 could be a modem, network card, or any other device to enable the node to communicate with other nodes. It is understood that any node could represent a plurality of interconnected (whether by intranet or Internet) computer systems, including without limitation, personal computers, mainframes, PDAs, and cell phones.

A computer system typically includes at least hardware capable of executing machine readable instructions, as well as the software for executing acts (typically machine-readable instructions) that produce a desired result. In addition, a computer system may include hybrids of hardware and software, as well as computer sub-systems.

Hardware generally includes at least processor-capable platforms, such as client-machines (also known as personal computers or servers), and hand-held processing devices (such as smart phones, personal digital assistants (PDAs), or personal computing devices (PCDs), for example). Further, hardware may include any physical device that is capable of storing machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as floppy disks, flash memory, or a CD ROM, for example). Software may include source or object code, for example. In addition, software encompasses any set of instructions capable of being executed in a client machine or server.

Combinations of software and hardware could also be used for providing enhanced functionality and performance for certain embodiments of the disclosed invention. One example is to directly manufacture software functions into a silicon chip. Accordingly, it should be understood that combinations of hardware and software are also included within the definition of a computer system and are thus envisioned by the invention as possible equivalent structures and equivalent methods.

Computer-readable mediums include passive data storage, such as a random access memory (RAM) as well as semi-permanent data storage such as a compact disk read only memory (CD-ROM). In addition, an embodiment of the invention may be embodied in the RAM of a computer to transform a standard computer into a new specific computing machine.

Data structures are defined organizations of data that may enable an embodiment of the invention. For example, a data structure may provide an organization of data, or an organization of executable code. Data signals could be carried across transmission mediums and store and transport various data structures, and, thus, may be used to transport an embodiment of the invention.

The system may be designed to work on any specific architecture. For example, the system may be executed on a single computer, local area networks, client-server networks, wide area networks, internets, hand-held and other portable and wireless devices and networks.

A database may be any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across the Internet. Note that more than one database may be implemented.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A system for determining velocities for microseismic fracture analysis, comprising:
   a seismic source coupled to a distal portion of a wireline, the seismic source further coupled to a seismic source trigger across the wireline;
   a sensor located at a proximal portion of the wireline configured to detect an electrical signal from the seismic source trigger;
   a transmitter coupled to the sensor configured to transmit a time value associated with the electrical signal;
   a first receiver configured to detect a microseismic event generated by the seismic source; and
   an analyzer configured to determine a velocity of the microseismic event at least partially in response to the transmitted time value associated with the electrical signal.

2. The system of claim 1, wherein the sensor is coupled to the wireline.

3. The system of claim 1, further comprising: a filter coupled to the sensor.

4. The system of claim 1, further comprising: a converter configured to convert the event into a digital signal.

5. The system of claim 1, further comprising: a recorder configured to record the event.

6. The system of claim 1, wherein the seismic source trigger is a power supply and the sensor is capable of detecting a change in electrical current.

7. The system of claim 1, further comprising: a second receiver configured to detect the microseismic event.

8. The system of claim 7, wherein the seismic source is disposed in a first well bore, the first receiver is disposed in a second well bore, and the second receiver is disposed in a third well bore.

9. The system of claim 7, wherein the seismic source is disposed in a first well bore, and the first receiver and the second receiver are disposed in a second well bore.

10. A system for determining velocities for microseismic fracture analysis, comprising:
    a seismic source coupled to a power supply and a distal portion of a wireline disposed in a first well bore;
    a sensor coupled to a proximal portion of the wireline, the sensor detecting a change in electrical current in the wireline; a filter coupled to a first amplifier, the filter splitting a signal from the sensor into a first split signal and a second split signal;
    a function generator coupled to the filter, the function generator generating a high-amplitude timing pulse from the second split signal;
    a transmitter that transmits the first split signal and the high-amplitude timing pulse;
    a receiver, disposed in a second well bore, that detects an event generated by the seismic source;
    a converter that converts the event into a digital signal; and
    an analyzer that calculates a microseismic velocity of the event using the high-amplitude timing pulse and digital signal.

11. The system of claim 10, wherein, when the seismic source is disposed in the first well bore, the sensor is positioned outside of the first well bore.

* * * * *